United States Patent [19]
Levin

[11] Patent Number: 5,051,960
[45] Date of Patent: Sep. 24, 1991

[54] METHOD OF REMOVING RECORDS OF MULTIPLE REFLECTION EVENTS FROM SEISMIC DATA

[75] Inventor: Stewart A. Levin, Carrollton, Tex.

[73] Assignee: Mobil Oil Corporation, Fairfax, Va.

[21] Appl. No.: 553,061

[22] Filed: Jul. 16, 1990

[51] Int. Cl.$^5$ .......................... G01V 1/36; G01V 1/38
[52] U.S. Cl. ...................................... 367/24; 367/38; 367/54
[58] Field of Search ...................... 367/24, 43, 54, 38, 367/45; 364/421

[56] References Cited

U.S. PATENT DOCUMENTS

| | | | |
|---|---|---|---|
| 3,587,039 | 6/1971 | Backus et al. | 367/24 |
| 4,069,471 | 1/1978 | Silverman | 367/54 |
| 4,665,510 | 5/1987 | Foster et al. | 367/24 |
| 4,887,243 | 12/1989 | Pann | 367/24 |
| 4,910,716 | 3/1990 | Kirlin et al. | 367/24 |

OTHER PUBLICATIONS

Amoco Corporation, U.K. Patent Application 2,217,843.
Backus, M. M., 1959, "Water Reverberations-Their Nature and Elimination", *Geophysics*, vol. 24, No. 2, pp. 233-261.
Bernth, H. and Sonneland, L., 1983, "Wave Field Extrapolation Techniques for Prestack Attenuation of Water Reverberations", presented at the 53rd Annual SEG Meeting, Las Vegas.
Berryhill, J. R. and Kim, Y. C., 1986, "Deep-Water Peg Legs and Multiples: Emulation and Suppression", *Geophysics*, vol. 51, No. 12, pp. 2177-2184.
Calvert, A. J., 1990, "Ray-Tracing-Based Prediction and Subtraction of Water-Layer Multiples", *Geophysics*, vol. 55, No. 4, pp. 443-451.
Egan, M. S., Craft, K. L. and Reed, R., 1988, "Dip-Dependent Deconvolution", Extended Abstract S3.6, SEG 58th Annual Meeting, Anaheim, pp. 731-733.
Golub, G. H. and Van Loan, C. F., 1989, *Matrix Computations*, 2nd Ed., The Johns Hopkins University Press, Baltimore, 642 p.
Hampson, D., 1986, "Inverse Velocity Stacking for Multiple Elimination", *J. Canadian Soc. Expl. Geoph.*, vol. 22, pp. 44-55.
Levin, S. A., 1987, "Deconvolution with Spatial Constraints", Ph.D. thesis, Dept. Geophysics, Stanford University, 76 p.
Loewenthal, D., Lu, L., Roberson, R. and Sherwood, J., 1974, "The Wave Equation Applied to Migration and Water Bottom Multiples", presented at the 44th Annual SEG Meeting, Dallas.
Michon, D., Wlodarczak, R. and Merland, J., 1971, "A New Method of Cancelling Multiple Reflections: 'Souston'", *Geophys. Prosp.*, vol. 19, pp. 615-625.
Morley, L. C., 1982, "Predictive Techniques for Marine Multiple Suppression", Ph.D. thesis, Stanford University.
Morley, L. and Heuermann, P., 1987, "Prestack Wave Predictive Multiple Suppression: Application to Prospecting in Santa Barbara Channel", Extended Abstract S4.4, SEG 57th Annual Meeting, New Orleans, pp. 483-485.
Ozdemir, H., 1981, "Optimum Hyperbolic Moveout Filters with Applications to Seismic Data", *Geoph. Prosp.*, vol. 29, pp. 702-714.
Riley, D. C. and Claerbout, J. F., 1976, "2-D Multiple Reflections",*Geophysics*, vol. 41, pp. 592-620.

(List continued on next page.)

*Primary Examiner*—Ian J. Lobo
*Attorney, Agent, or Firm*—Alexander J. McKillop; Charles J. Speciale; George W. Hager, Jr.

[57] ABSTRACT

A method of removing multiple reflection events from seismic records is described. A shallow primary reflection event is used as a model for a deeper primary, and is distorted responsive to the predicted static correction to yield a model for the multiple. The method is applied to common depth point (CDP) records, in which the common-midpoint contribution of the multiple to each CDP record can be assumed to be equal. Preferably, a total least squares correlation step is used to design a convolutional filter applied to the data records to remove the multiples therefrom.

5 Claims, 6 Drawing Sheets

OTHER PUBLICATIONS

Ryu, J. V., 1982, "Decomposition (DECOM) Approach Applied to Wavefield Analysis with Seismic Reflection Records", *Geophysics*, vol. 47, pp. 869-883.

Schneider, W. A., Prince, Jr., E. R. and Giles, B. F., 1965, "A New Data-Processing Technique for Multiple Attenuation Exploiting Differential Normal Moveout", *Geophysics*, vol. 30, pp. 348-362.

Verschuur, D. J., Herrmann, P., Kinneging, N. A., Wapenaar, C. P. A. and Berkhut, A. J., 1988, "Elimination of Surface-Related Multiply Reflected and Converted Waves", Extended Abstract S14.2, SEG 58th Annual Meeting, Anaheim, pp. 1017-1020.

Verschuur, D. J., Berkhout, A. J. and Wapenaar, C. P. A., 1989, "Wavelet Estimation by Prestack Multiple Elimination", Extended Abstract SP1.8, SEG 59th Annual Meeting, Dallas, pp. 1129-1132.

Wiggins, J. W., 1988, "Attenuation of Complex Water-Bottom Multiples by Wave-Equation-Based Prediction and Subtraction", *Geophysics*, vol. 53, pp. 1527-1539.

Yang, M., 1989, "Multiple Suppression by Optimized Fold Reduction", *Geophysics*, vol. 54, No. 11, pp. 1448-1454.

Yilmaz, O., 1988, "Velocity-Stack Processing", Extended Abstract S14.1, SEG 58th Annual Meeting, Anaheim, pp. 1013-1016.

Yilmaz, O., 1987, *Seismic Data Processing*, Society of Exploration Geophysicists, pp. 51-53, 183-239.

WEATHERED, LOW VELOCITY MATERIAL

METHOD OF REMOVING RECORDS OF MULTIPLE REFLECTION EVENTS FROM SEISMIC DATA

FIELD OF THE INVENTION

This invention relates to a method for removing the records of multiple reflection events from seismic data. More particularly, this invention relates to a method of generating one or more digital filters corresponding to a multiple reflection event and using these filters to process seismic data to effectively remove the record of the multiple reflection event from the data.

BACKGROUND OF THE INVENTION

Exploration seismic reflection methods for subsurface profiling are well known. This application conforms to "Encyclopedic Dictionary of Exploration Geophysics" (R. E. Sheriff, Society of Exploration Geophysicists, 2nd ed. 1984), in its use of standard terms. In particular, this application incorporates the definitions of the following terms: common-depth-point (CDP), midpoint, offset normal moveout (NMO), primary reflection (primary), multiple reflection (multiple), peg-leg multiple, predictive deconvolution, weathered layer static corrections (statics), Fresnel zone, Snell's Law, and dip moveout found in that reference.

It is commonplace in seismic exploration to impart seismic energy to the surface of the earth at a first location, and to measure the structure's response to the input energy at a plurality of second locations to generate a cross-sectional picture of a portion of the earth. More particularly, seismic energy can be imparted to the earth on land by detonating a charge of dynamite or vibrating a heavy object at the surface of the earth, or at sea by rapidly releasing a charge of compressed air into the sea water. In either event, a pulse of energy travels downwardly into the earth. Eventually, the energy is reflected at interfaces between layers of varying types of rock in the earth, due to the varying acoustic impedance of the differing layers, and is reflected upwardly. The seismic energy can be detected by detectors termed "geophones" in connection with earth-based exploration or "hydrophones" in connection with waterborne exploration. The signals output by the detectors can be used to provide a picture of the subterranean structure, which can then be used by geophysicists in the search for oil, gas, and other minerals.

Conventionally, the output of each individual detector is recorded as a function of time. The output signal includes noise in the signal and energy detected after reflection from one of the subterranean interfaces. Much effort has been expended in reducing noise in these records, and also in eliminating undesirable additional energy reflection events therefrom. More particularly, when energy is input to the earth at a first location, it typically travels into the earth and is reflected to some degree at each of a large number of interfaces and reflects back upwardly to the detectors, where it can be detected and recorded. The energy detected after reflection from an interface and direct travel upwardly to a detector is termed a primary reflection, or simply a primary. However, energy also is reflected at intermediate interfaces, travels back up to the surface of the earth, is reflected there strongly due to the high impedance change at the surface of the earth, travels back downwardly, is again reflected from the same or a different interface, and is reflected upwardly Such reflection paths, which involve several distinct downward-going and upward-going ray paths, are referred to as "multiples" and, if not properly removed from the records, can effectively obscure the primary reflection events of interest.

A number of different techniques have been proposed and successfully implemented for removing multiples from seismic reflection data under certain circumstances. For example, multiples generated in shallow-water exploration over generally horizontal structures can be attenuated by predictive deconvolution (Backus, 1959). This technique assumes a stable, predictable vertical reverberation of acoustic energy between the top and bottom of the shallow water layer.

In certain cases, again involving marine exploration, deep water multiples and so-called water-bottom peg leg multiples are successfully removed by relaxing the assumption of simple vertical reverberation and employing computerized ray-tracing or acoustic wave simulation to predict and remove the effects of reverberation within the water layer (Michon et al., 1971, Loewenthal et al., 1974; Morley, 1982, 1987; Bernth and Sonneland, 1983., Berryhill and Kim, 1986. Wiggins 1988; Levin, 1987; Calvert, 1990).

Another predictive-type multiple removal method is the so-called Noah's method (Riley and Claerbout, 1976; Verschuur et al. 1988, 1989). In this approach, the effect of reflection from the surface at which seismic recordings are made is predicted directly from recorded data generated by seismic sources activated at or near a given point of surface reflection. This leads to a simple feedback relation on the seismic data which is then inverted to estimate equivalent seismic data that would have been recorded in the absence of a reflecting free surface.

Another common approach to rejecting multiples from common depth point (CDP) records is referred to generally as moveout or velocity filtering. In these methods a simple geometric model of arrival time with shot-to-receiver offset is employed, either hyperbolic or parabolic, depending mostly upon whether normal moveout (NMO) correction as defined above is applied to the data. According to this model, primaries and multiples that arrive in overlapping time intervals are distinguished by generally distinct moveout along their arrival curves because of differences in acoustic propagation velocities encountered along their respective propagation paths. In particular it is the general rule that acoustic velocity increases with depth in the earth; accordingly, the multiples, because they reverberate within the shallower portions of the subsurface, are generally characterized by their lower effective moveout velocities. Based upon this assumption, digital filters are designed to preferentially reject the lower velocity arrivals (Schneider et al., 1965., Ozdemir, 1981., Ryu, 1982; Hampson, 1986; Yilmaz, 1988; Yang, 1989). Indeed, the CDP stack (defined above), itself oftentimes an effective attenuator of multiples, is considered the progenitor of these methods. Because they are not tied to any single specific multiple reverberation mechanism, moveout-based multiple removal methods are the principal tools currently used to attenuate multiples generated in both land and marine exploration.

Moveout filtering has also been adapted in various ways to traces gathered other than in CDPs. In the presence of dipping subsurface layering, the moveout differences between multiples and primaries are further magnified by forming common-shot or common-receiver gathers (Amoco Corporation, U.K. Patent Application 2,217,843). Conventional dip moveout corrections (DMO) are also useful in improving the velocity separation of primary and multiple in these settings (Egan et al., 1988).

A factor which complicates the analysis and processing of seismic records made during land-based exploration, both for multiple attenuation and otherwise is the presence of static shifts induced by highly variable, near-surface weathering of the earth. These delays are induced by the weathering at both the source and receiver position of each trace and need to be measured or estimated by various means in order to properly align reflections in CDP gathers prior to the CDP stack. Commonly used techniques for estimating and correcting for these delays are elevation statics, refraction statics, and residual statics. See Yilmaz, *Seismic Data Processing*, Society of Exploration Geophysicists (1987). For the purposes of this invention, we will assume that appropriate static corrections have already been made to the seismic data being processed.

SUMMARY OF THE INVENTION

The present invention has as its principal object the effective removal of multiple reflections that arise from reflection at the surface during land exploration. At or near the surface reflection point, these multiples must pass through the near-surface weathered zone. This additional transit through the weathered zone produces differential delays on the multiple reflections that do not occur on primary reflections. The present invention achieves its object by predicting these additional delays from previously estimated primary static corrections and designing data-dependent digital filters to selectively identify and extract seismic arrivals fitting this delay pattern. This separated multiple reflection energy is then removed from the seismic records by subtraction.

The idea of employing statics to differentiate multiples from primaries is novel. The effect of the additional transit is not readily apparent within any individual CDP gather because it produces essentially the same delay on all traces within the CDP gather, as indicated below in connection with FIG. 3. Employment of the effect requires consideration of a plurality of adjacent CDP gathers, for example, sorted into common-offset records taken with respect to "bins" of one or more closely spaced offsets., this procedure is not part of the conventional practice for processing of land seismic data.

The steps in the filter design and application process according to the invention can be summarized as follows:

On seismic data records that have been previously corrected for normal moveout (NMO) and statics according to standard practices, one initially identifies a first zone or "window" of primary reflections appearing on a range of the seismic data records.

One then identifies a second zone or window of primary reflection energy that also corresponds to the primary reflectors, but which is obscured by multiple reflections between the earth's surface and one or more shallow primary reflectors.

One then modifies the first primary window for offset and NMO traveltime differences between the first primary window and the second zone of partially obscured seismic data, and then further modifies the second window in accordance with static shifts defined at corresponding surface CDP locations to serve as a model for the multiple reflections attributed to the shallow primary reflecting zone.

Next, one selects a third zone of primary reflection, which can be the first primary window, and, after correction for the time differences between this third zone and the second zone of partially obscured seismic data, uses the third zone as a model for the primary reflections in the partially obscured data.

A total least-squares procedure is then used to define digital filters that separately shape the primary and the multiple models so that their sum most closely approximates the seismic data in the second primary zone. Lastly, the multiple model, as thus modified by its corresponding digital filter, is subtracted from the seismic data, thereby "unobscuring" the second zone of primary reflection.

The employment of the total least-squares procedure to thus design the filter, instead of conventional two-channel correlation methods, i.e. ordinary least-squares is both novel in this context and highly advantageous to successful application of this invention to typical land seismic reflection data.

BRIEF DESCRIPTION OF THE DRAWINGS

The invention will be better understood if reference is made to the accompanying drawings, in which.

DESCRIPTION OF THE PREFERRED EMBODIMENTS

Figure 1A:
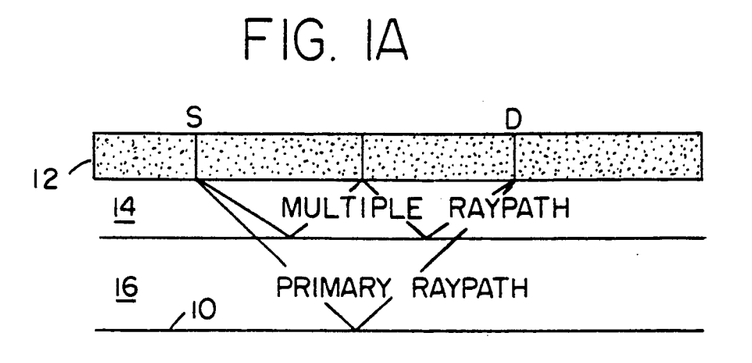
FIG. 1(a) shows a flat-layer schematic depiction of the manner in which multiple reflection events are commonly recorded together with primary events.

FIG. 1(a) shows a highly schematic cross-sectional view of the earth, illustrating a primary ray path of seismic energy. The energy travels downwardly from a source S into the earth, through a weathered layer 12 and through two layers of consolidated rock 14 and 16, is reflected from a primary reflector 10 and travels back upwardly through the consolidated rock layers 16 and 14 and the weathered layer 12, reaching the surface where it is detected at a detector location D. Also shown in FIG. 1(a) is a multiple ray path, along which energy travels downward through the weathered layer 12 beneath the source S, travels through the first rock layer 14, is reflected from the interface between the first consolidated rock layer 14 and the second rock layer 16, travels upwardly through the layer 14 and weathered layer 12, is reflected back downwardly from the surface, traverses the weathered layer again and the consolidated layer 14 twice more, being reflected from the interface between layers 14 and 16, again traverses the weathered layer 12, and is eventually detected at the detector location D. It will be appreciated that, depending on the relative velocities of sound in the two rock layers, the record of the energy reaching the detector D by the multiple ray path may coincide with the record of the energy reaching the detector by means of the primary ray path, thus obscuring the record of the primary event, which is of principal interest in deriving a useful depiction of the subterranean structure.

It will be observed that in FIG. 1(a) the ray path is shown as essentially vertical in the weathered layer 12, while the energy travels at angles to the vertical in the rock layers 14 and 16. If the material between the source S and detector D and the reflector 10 were homogeneous, the angle made by the ray path would simply be determined by the horizontal "offset" between the source and detector and the thickness of the layer. However where a plurality of layers are present, the relative velocity of sound in each of the layers governs the amount of the horizontal offset in each layer according to Snell's law. Since the velocity of seismic energy in the weathered layer 12 is relatively low, the ray path in this layer is substantially vertical.

Figure 1B:
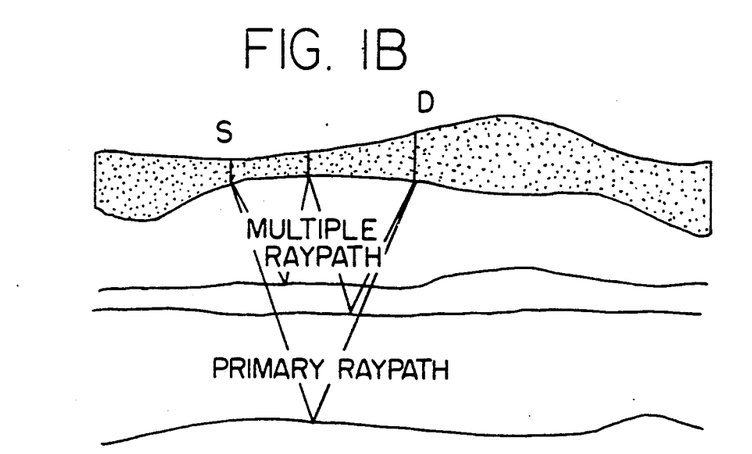
FIG. 1(b) shows a somewhat more realistic representation of how this can occur.

FIG. 1(b) shows a more typical structure of the earth wherein the layers are not strictly planar and, in particular, where the weathered layer varies quite substantially in thickness and traveltime from one location to the next. Attenuation of the record of the multiple reflections in the overall seismic record by means of the present invention is usually enhanced in such a "real world" case because the greater static variations magnify the differences between primary and multiple.

Figure 2:
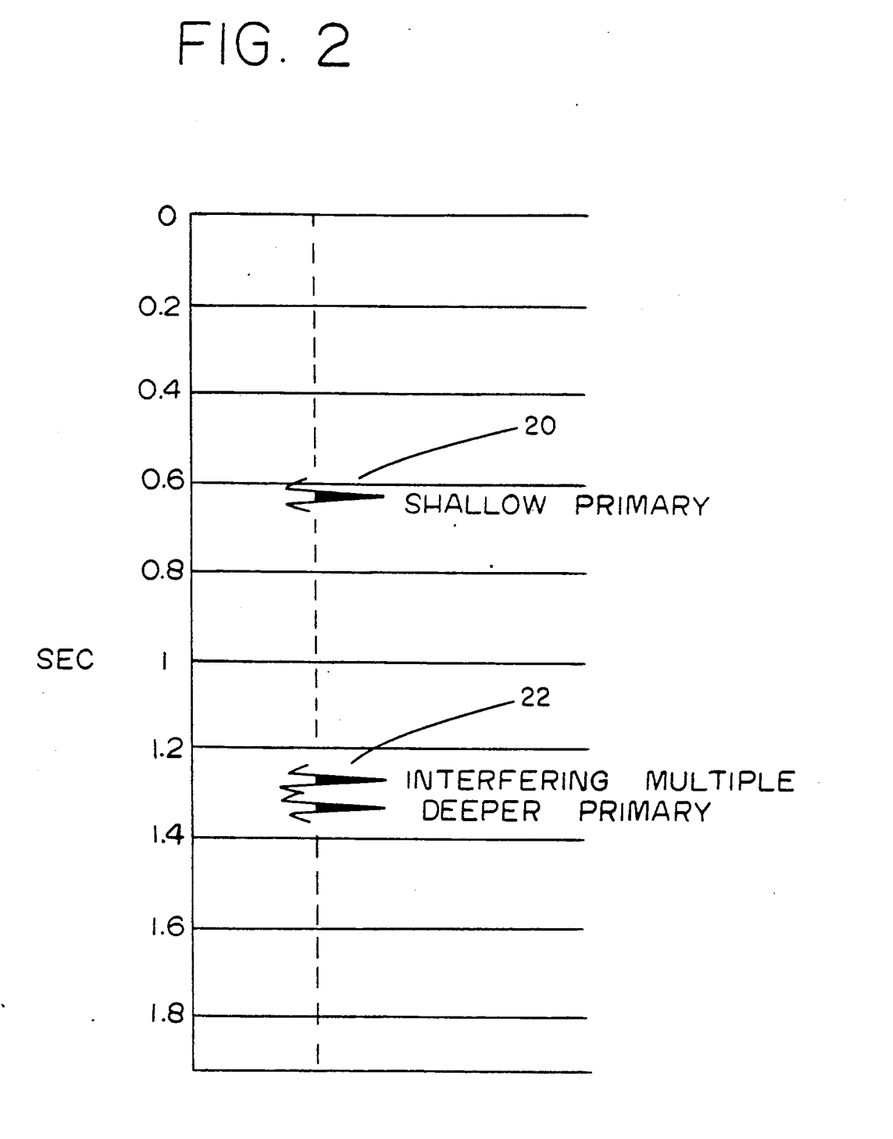
FIG. 2 shows a schematic representation of a single seismic trace involving reflection from a shallow reflector and a deeper primary reflector, and an interfering multiple.

FIG. 2 shows a synthetic seismogram, that is, a modeled example of a single data trace which might be recorded by a detector D in response to seismic energy input to the earth at a source S. In this Figure, the vertical axis is time and the horizontal excursions are proportional to the amplitude of the signal output by the detector at location D. Traces of this general type are displayed next to one another to depict the subterranean structure. In this record, one sees a wavelet 20 corresponding to direct reflection of the seismic energy from a shallow primary reflector, e.g. the interface between layers 14 and 16 of FIG. 1(a). The lower event 22 corresponds to the reflection of the seismic energy from a deeper primary reflector e.g. reflector 10 in FIG. 1(a), and an interfering multiple as, for example, in the upper ray path in FIG. 1(a). Clearly, it is very difficult to interpret the seismogram where the multiple and primary overlap; indeed it is normally difficult to unravel which is which.

Figure 3:
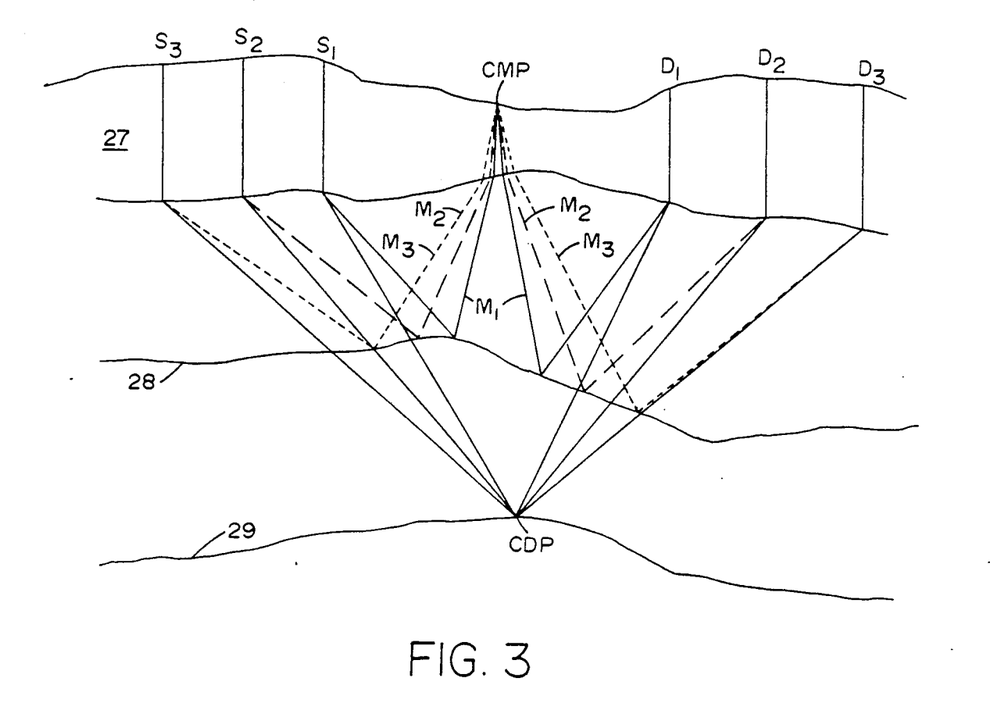
FIG. 3 shows schematically primary and multiple ray paths in the earth between pluralities of sources and detectors.

FIG. 3 shows a typical geometry for seismic sources, detectors, and ray paths for a single CDP gather. As indicated, the various ray paths corresponding to multiple reflection between the surface and the subsurface reflector 28 all impinge upon the surface at substantially the same surface location, termed the common midpoint (CMP), just as the various ray paths corresponding to the primary reflector 29 impinge upon that reflector at substantially the same CDP location This implies that, after geometric corrections for traveltime and offset differences, a multiplicity of traces in each CDP gather may be employed to increase the statistical reliability of the multiple estimation and extraction process used in this invention.

Stated differently, the fact that the multiples all involve reflection from the same CMP on the surface in effect means that they all experience the same contribution due to their travel in the static layer 27. Moreover, the further fact that the ray path in the static layer 27 is essentially vertical means that the travel times therein are essentially uniform regardless of the substantial variation in source-to-detector offset.

In order to improve the statistical reliability of the method of the present invention, the range of source-to-detector offsets is subdivided into "bins" and the traces of the overall seismic data recording are separated into groups according to these bins. Each bin is separately processed by the procedure to be described below. Choice of the number and ranges of these bins is a tradeoff between using only a few bins for enhanced statistical reliability, as mentioned above, and using many bins to decrease the sensitivity of the estimation process to errors in the NMO velocities supplied for the various primaries and multiples. In practice, good results with this invention have been achieved by using many bins and decreasing their number only when instability in the filter design appears.

Figure 4:
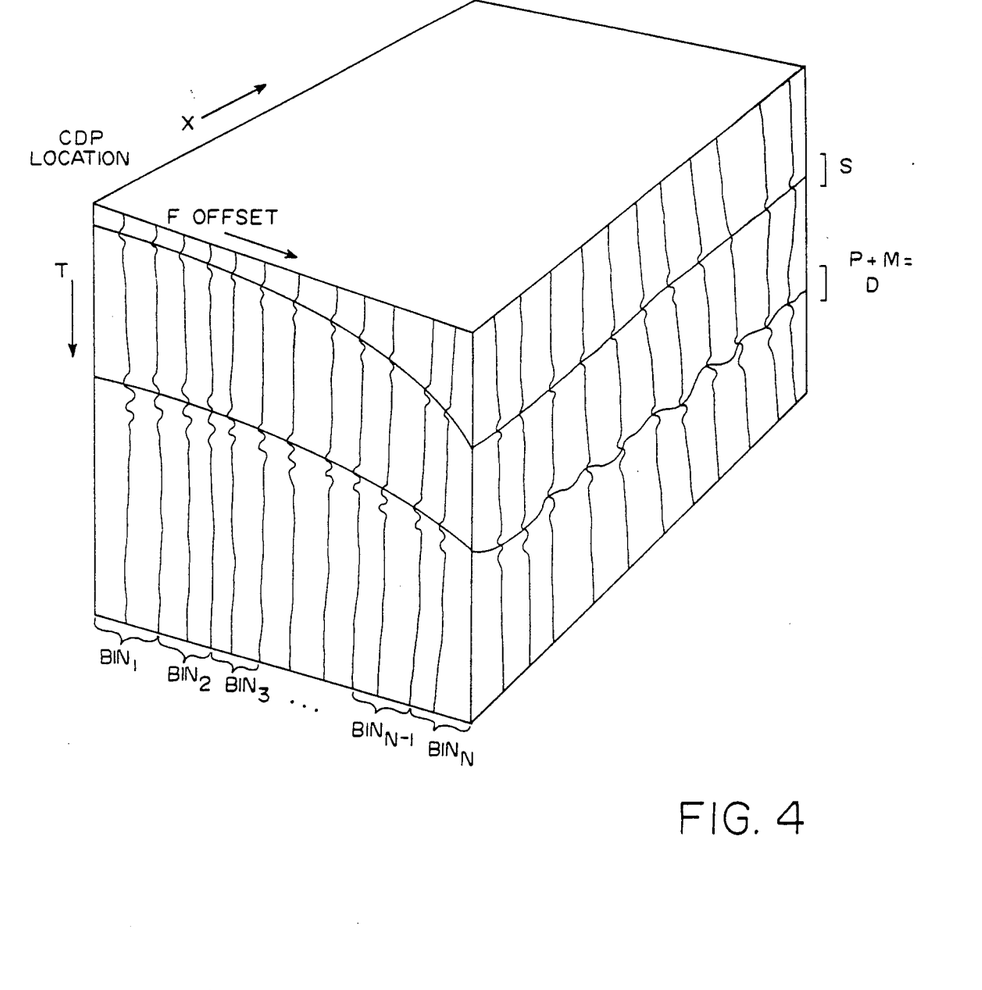
FIG. 4 shows a representation of a three-dimensional matrix of records useful in understanding the process of the invention.

FIG. 4 shows how the traces from a seismic survey may be organized for this purpose. FIG. 4 depicts a three-dimensional array of traces where time t is the vertical axis, source-to-receiver offset f is one horizontal axis and CDP location x is the second horizontal axis. According to accepted practice, both normal moveout and static corrections have been applied to the traces. The CDP gathers are organized into "slices" parallel to the t-f coordinate plane. In these slices, all of the multiple ray paths will involve reflection from the same CMP. As depicted in the endmost slice parallel to the t-f plane, these gathers exhibit generally flat arrival time trends with some residual moveout likely with increasing offset. A reflection S from a near-surface reflector is in the upper portion of the gather while the combined record of a second deeper primary reflector and the interfering multiple which obscures it is in the later portion. When viewed in common-offset slices parallel to the t-x coordinate plane, the traces exhibit a generally horizontal primary reflection S and similarly aligned overlapping deeper primary and multiple reflections P and M as shown. The trace-to-trace variations in M due to uncorrected midpoint reflection static delays causes M to "snake" up and down with respect to the primaries P and S.

It will be appreciated by those of skill in the art that correct computation of the additional static delays as above, while essentially conventional, depends upon the particular choice of statics estimation procedure that has been previously applied to the seismic data. One common procedure is to estimate statics in two stages: elevation statics followed by surface-consistent residual statics. In this setting, the additional static delay may be equated to twice the sum of the elevation static at the CDP midpoint location and the static for a receiver at that same location. Another common statics estimation procedure is refraction statics. In this method the statics are estimated directly rather than in two stages and the additional static delay may be simply equated to twice that measured at the CDP midpoint location.

Whatever the particular choice of procedure for computing the additional static delays for the multiple reflection, it is advantageous in practice of the invention to include some smoothing or averaging across adjacent CDP's. The reason for doing so is that the seismic energy that is multiply-reflected by the earth's surface does not propagate purely along ray paths, but is spread over an area whose representative size is a Fresnel zone. That is, as in the case of all travel of energy through a complex structure, the energy propagates spherically from each point., the ray path correctly represents the path of the statistical center of the energy. Thus the record of the multiple reflection is delayed by a spatial average of the near-surface static delay. It is theoretically possible to numerically back-propagate the recorded multiples to the vicinity of the surface reflection zone in order to remove this averaging or healing effect. However, the cost of such a procedure is relatively high and the additional information and precision needed to usefully effect the transformation are not always attainable.

Figure 5:
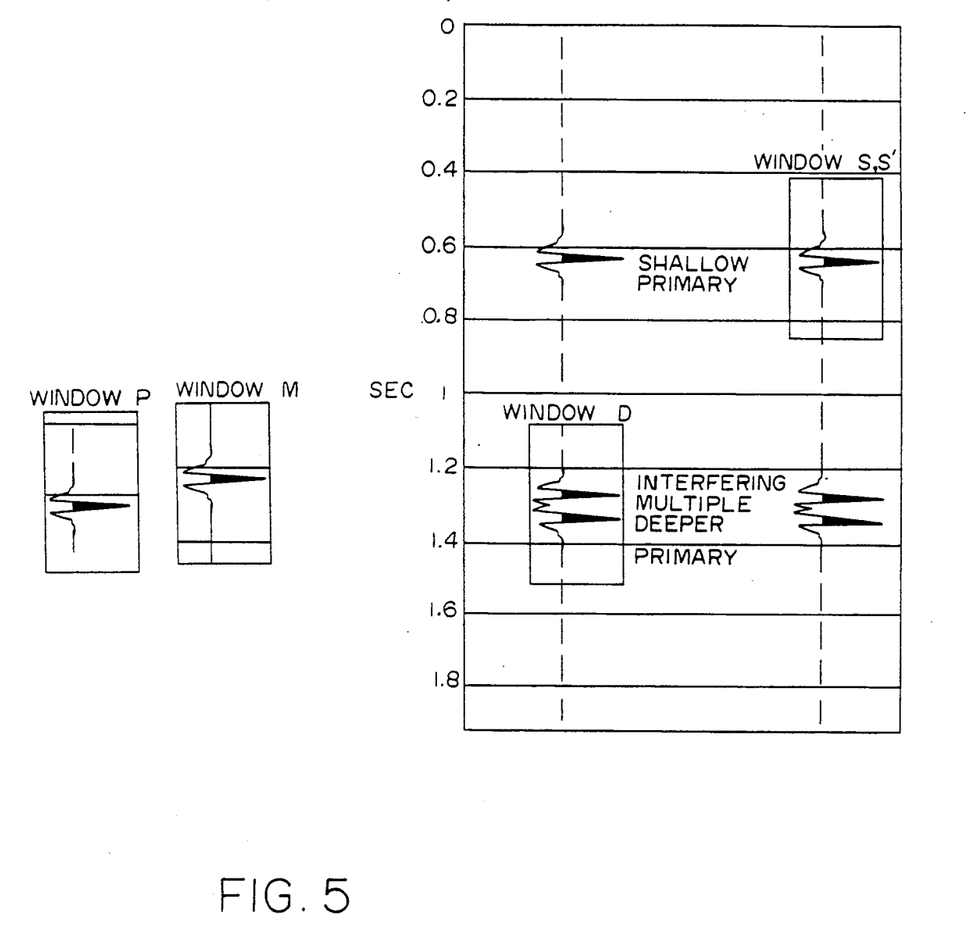
FIG. 5 shows how the seismic records of FIG. 2 can be subdivided to separate the interfering multiple from the deep primary.
Figure 6:
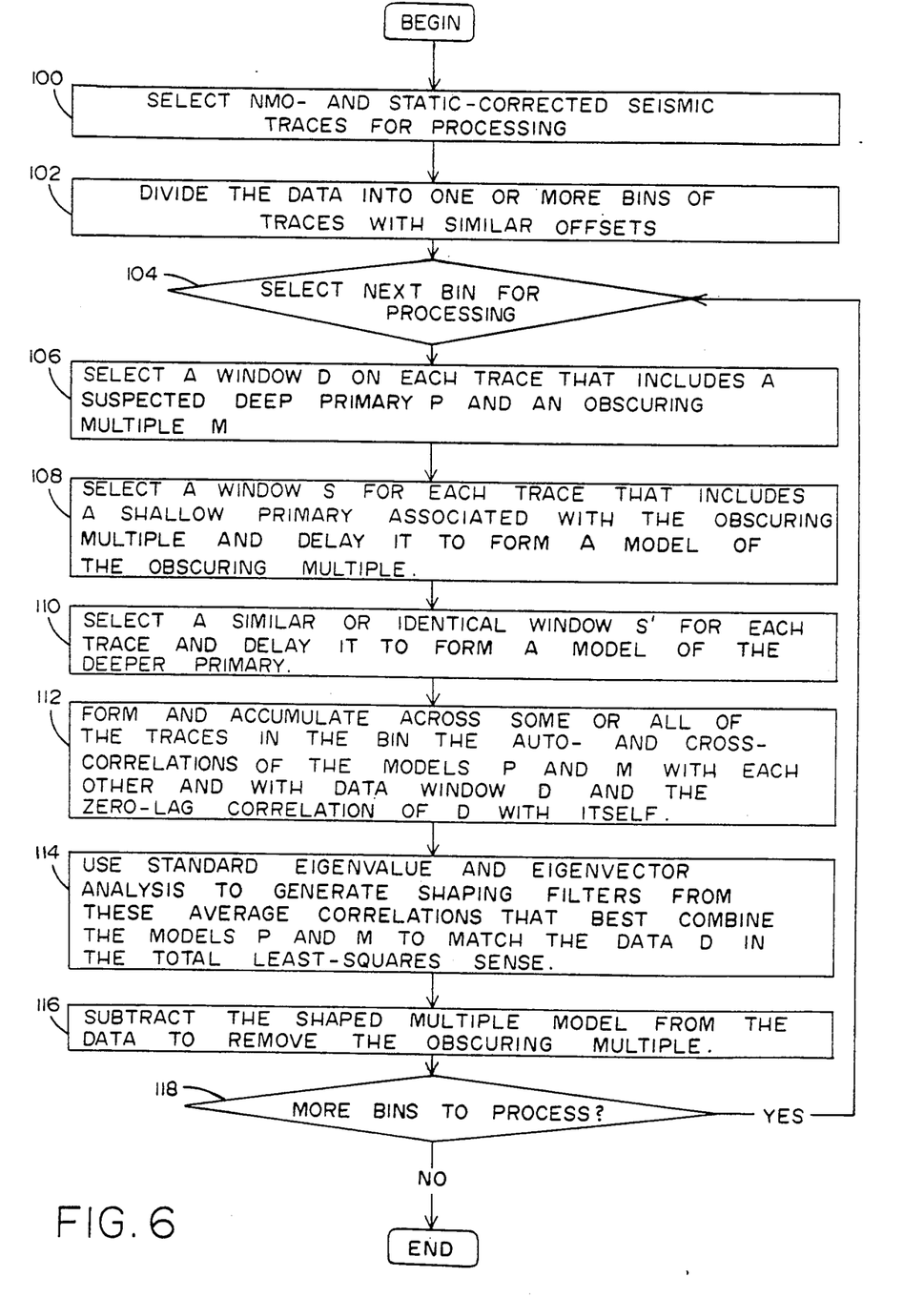
FIG. 6 shows a flowchart of steps carried out in performance of the method of the invention.

FIG. 6 shows, as mentioned above, a flow chart of the overall steps taken in seismic data processing according to the invention. As discussed above, the process essentially begins at step 100 with selection of suitable NMO preprocessed and static corrected traces for processing according to the invention. At 102 the data is divided into one or more bins of traces with similar offsets as explained above in connection with FIG. 4. At step 104 a bin of traces is selected for processing. The next step 106 is selection of the window D on each trace that includes a suspected deep primary P and obscuring multiple M as explained above. This step and the subsequent steps 108 and 110 in which windows S and S' are selected are performed as follows:

From conventional analysis and processing of the seismic data, the arrival times, NMO velocities and statics associated with the primaries S and P are already known and hence the arrival time of the interfering multiple can be readily predicted for any given seismic data trace. According to the invention, one can use this information to form a model of the interfering multiple arrival M by selecting a suitable window encompassing the shallow primary S and delaying it by this predicted traveltime difference. See FIG. 5 for examples of these windows. One then also chooses a similar or identical window S' encompassing unobscured primary reflection energy generally conformable to the partially obscured primary, and forms a model of the desired primary P by delaying the window according to the known P and S' arrival times. Although a conformable, unobscured zone S' will not necessarily exist on any specific seismic data, most seismic exploration is concentrated in areas of continuous uniform sedimentary deposition, and it will be appreciated that S' will often be readily available in such settings.

Two specific choices of the shallow primary window are especially advantageous. For each trace in the bin to be processed, one may choose to select the window S from that particular trace. This choice neutralizes the effect of variations in sensitivity between different receivers in the seismic survey. Alternatively, one may choose the window from traces at or near half the offset of each trace in the bin. The rationale for this is to most faithfully capture the wavefield that was reflected at the surface to form the interfering multiple M.

Mathematical formulas for the time corrections needed to delay windows S' and S (which can be identical, as noted above) to transform them into models for windows P and M, as performed in steps 108 and 110, may be determined as follows:

Let $V_S$ and $V_P$ be the NMO velocities associated with the shallow and deep primary reflections respectively. Let $t_S$ and $t_P$ be the zero-offset reflection traveltimes associated with these reflections and let $t_S'$ be the zero-offset reflection traveltime of the primary reflection S'. Let F be the source-to-receiver offset associated with a particular window chosen for the deep primary. Finally, let $\Delta t$ be the additional static delay associated with travel of the energy up and back through the weathered zone at the source-to-receiver midpoint as discussed above.

The formulas then for the traveltimes $\Delta T_p$ and $\Delta T_m$ needed to delay S' and S to form P and M, respectively, are:

$$\Delta T_p = t_p - t_S' \tag{1}$$

and $$\Delta T_M = [4t^2_S + (F/V_S)^2]^{\frac{1}{2}} - [4t^2_S + (F/V_P)^2]^{\frac{1}{2}} + t_S + \Delta t.$$

Having selected the windows S and S'0 corresponding to each of the traces in a selected bin, one forms from them initial models for P and M using the above formulas. It will be appreciated that each such model consists of a collection of related windows, one for each trace in the bin. Two shaping filters $f_P$ and $f_M$ are then designed in step 114, to improve the fit of the models to the seismic data in a window D encompassing the actual deeper primary and its obscuring multiple. The purpose of this improvement is to accommodate differences in amplitude, timing and phase caused by propagation effects of the earth and modifications of the seismic data during prior processing It is to be understood that the shaping filters are considered independent of the particular location of any trace within the bin, although it is statistically permissible and occasionally advantageous to relax this assumption and allow the shaping filters to vary slowly along the midpoint coordinate x.

As a preliminary step in design of the shaping filters in step 114, the cross-correlations of the models P and M with each other and with the data window D and the zero lag auto-correlation of D with itself are calculated in step 112. As will be appreciated by those of skill in the art, these quantities are used in the subsequent calculation of the shaping filters according to the preferred embodiment of the invention.

Figure 7:
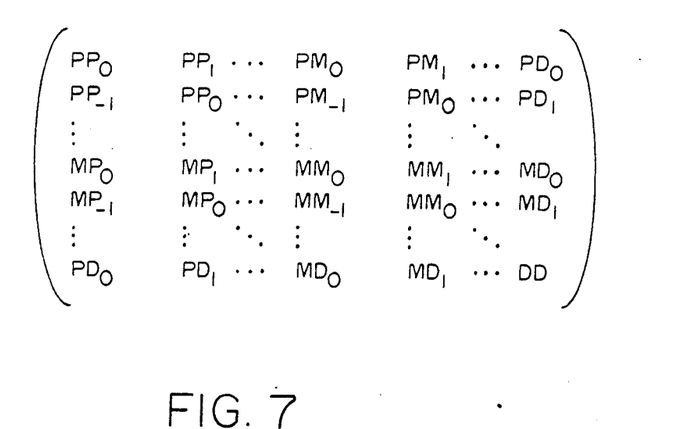
FIG. 7 shows the arrangement of a matrix of coefficients used in a particularly advantageous realization of the method of the invention.

More particularly, according to the preferred embodiment of this invention, the shaping filters are selected so that the cross-correlations $f_p*P$ and $f_M*M$ calculated in step 112 best approximate D in the sense of total least-squares (Golub and Van Loan, 1989) over some subset of the traces in the bin. Employment of the total least-squares criterion (e.g. as opposed to employment of the far more typical simple least squares filter design process) recognizes that the input models P and M are not error free and indeed have levels of random recording noise of the same order as that appearing in the data windows D. A particularly advantageous implementation of the total least-squares procedure explicitly forms an auto- and cross-correlation matrix as depicted schematically in FIG. 7, and then applies any of the standard algorithms for eigenvalue and eigenvector decomposition to the matrix in order to obtain the required shaping filters. See Golub and Van Loan, supra. The correlations are accumulated across some or all of the traces in the bin.

Once the shaping filters have been designed, the refined multiple estimate $f_M*M$ is then subtracted in step 116 from the seismic data within the data windows D for all the traces in the bin. The process is repeated until all of the bins have been similarly processed, as indicated at 118. The resultant traces, having had the multiples removed, can be processed conventionally to display a record of the subterranean structure of the earth.

While a preferred embodiment of the invention has been described in detail, it will be appreciated by those of skill in the art that other modifications and improvements thereto can be made without departure from the spirit and scope of the invention. Accordingly, the invention is not to be measured by the above exemplary disclosure, but only by the following claims.

I claim:

1. A method of removing records of multiple reflection events from a collection of normal moveout corrected seismic data traces, said traces consisting of signals recorded by detectors responsive to seismic energy transmitted into the structure of the earth by seismic energy sources, comprising the steps of:
   (a) selecting a first, unobscured primary reflection appearing on some or all of the seismic traces, and determining its total traveltime between source and detector;
   (b) identifying a second primary reflection at least partially obscured on some or all of the traces by a multiple reflection of the first primary reflection, and determining its total traveltime between source and detector;
   (c) selecting a third, unobscured primary reflection appearing on some or all of the seismic traces that generally conforms t the partially obscured second primary reflection, and determining its total traveltime between source and detector;
   (d) computing, from pre-existing static corrections, a static delay equal to the additional transit time of a seismic signal up and back down through the near-surface weathered zone at each source-to-receiver midpoint;
   (e).
      (i) determining the difference in traveltime between the first and second reflections, and using the third primary reflection, delayed according to the difference in traveltime between the first and second reflections, as a model of the second primary reflection; and
      (ii) using the first primary reflection, delayed effectively according to (1) the additional static delays computed in step (d), (2) the traveltime of the first primary reflection, and (3) the differences in normal moveout velocities and offsets of the first and second primary reflections, as a model of the obscuring multiple,
   (f) estimating from the models of the second primary reflection and obscuring multiple reflection the actual contribution of the second primary reflection and obscuring multiple to the seismic traces, and
   (g) subtracting the estimated contribution of the multiple reflection from the traces.

2. The method of claim 1 wherein said step (f) is performed by designing digital shaping filters for each of the models of steps (e) (i) and (e) (ii) such that after application of said filters to the first and third primary reflections, the result closely matches a portion of the seismic data containing at least the partially obscured second primary identified in step b.

3. The method of claim 2, wherein each said step of designing a digital shaping filter is performed by carrying out a total least-squares comparison of the modeled reflection to the corresponding identified reflection.

4. The method of claim 1 wherein such seismic data traces are corrected for static contribution at the respective source and the respective source and detector locations prior to said steps (d) and (e).

5. The method of claim 1 wherein said selected first and third primary reflections are one and the same.

* * * * *